United States Patent
Fisher

(10) Patent No.: US 7,186,950 B1
(45) Date of Patent: Mar. 6, 2007

(54) WELDER WITH LIGHT SOURCE

(76) Inventor: Carl M. Fisher, 1560 East Rd., 2N, Chino Valley, AZ (US) 86323

( * ) Notice: Subject to any disclaimer, the term of this patent is extended or adjusted under 35 U.S.C. 154(b) by 0 days.

(21) Appl. No.: 11/401,691

(22) Filed: Apr. 11, 2006

Related U.S. Application Data

(60) Provisional application No. 60/691,817, filed on Jun. 17, 2005.

(51) Int. Cl.
 *B23K 9/32* (2006.01)
(52) U.S. Cl. ..................................... 219/136
(58) Field of Classification Search .................. 219/74, 219/75, 136, 137.31; 362/109, 119, 120
 See application file for complete search history.

(56) References Cited

U.S. PATENT DOCUMENTS

| | | | |
|---|---|---|---|
| 2,046,999 A | | 7/1936 | Bredtschneider |
| 2,196,171 A | | 4/1940 | Arnesen |
| 3,227,866 A | | 1/1966 | Peters et al. |
| 3,316,385 A | * | 4/1967 | Anton ........................ 219/236 |
| 3,671,707 A | * | 6/1972 | Cunningham ................ 219/74 |
| 4,303,967 A | | 12/1981 | Letsche |
| 4,491,719 A | | 1/1985 | Corby, Jr. |
| 4,497,996 A | * | 2/1985 | Libby et al. ........... 219/124.34 |
| 4,532,405 A | | 7/1985 | Corby, Jr. et al. |
| 4,599,506 A | | 7/1986 | Burke et al. |
| 4,642,738 A | | 2/1987 | Meller |
| 4,670,821 A | * | 6/1987 | Treadway .................... 362/104 |
| 4,724,301 A | | 2/1988 | Shibata et al. |
| 5,329,089 A | | 7/1994 | McGee et al. |
| 6,582,219 B1 | * | 6/2003 | Rockwell, Jr. .............. 362/109 |
| 2002/0141180 A1 | | 10/2002 | Liao |

* cited by examiner

*Primary Examiner*—Clifford C. Shaw
(74) *Attorney, Agent, or Firm*—Parsons & Goltry; Michael W. Goltry; Robert A. Parsons

(57) ABSTRACT

In a welder wand including a welding tip attached to handle with an elongate, rigid conduit, the handle having a trigger for activating the welding tip, improvements therein including an optical light system attached to the welder wand comprising a light source mounted proximate to the welding tip and a switch mounted proximate to the handle, the switch operatively coupled to the light source for selectively activating and deactivating the light source, whereby the light source produces and directs light at the welding tip when activated by the switch.

3 Claims, 5 Drawing Sheets

WELDER WITH LIGHT SOURCE

CROSS REFERENCE TO RELATED APPLICATION

This application claims the benefit of U.S. Provisional Application No. 60/691,817, filed Jun. 17, 2005.

FIELD OF THE INVENTION

The present invention relates to welders and, more particularly, to a welder with a light source.

BACKGROUND OF THE INVENTION

There are many different types of welders used to fuse pieces of metal together. The different types of welders are generally put into two categories which depend on the energy source employed. One category of welders uses an energy source within the work pieces to be welded together. These types of welders include electric resistance welding, friction welding, diffusion welding, explosive welding, and ultrasonic welding. The other category of welders uses an external energy source, such as a flame, an electric arc, an electron beam, a laser beam, or a plasma jet. This second category is the most widely used in industry, except the automotive industry, where resistance welding is typically used. Electric arc welding, however, is by far the most widely-used technique for the welding of metals and alloys.

There are generally two different types of arc welding processes. One type uses a coated welding tip and the other type uses a consumable welding tip. The coated electrode is used less than the consumable electrode because of its lower productivity. However, the coated electrode generally provides higher quality welds. Arc welders can use different types of gasses which are ignited by the electric arc. For example, one type of arc welder uses oxy-acetylene welding because the gas includes a mixture of oxygen and acetylene gas. Another type of arc welder uses a metal inert gas (MIG) which is typically a mixture of carbon and argon gas. The carbon and argon gas form an envelope around the welding joint to push oxygen out of the way so that a better weld can be provided.

In any case, the energy source and/or the ignited gas both generate a tremendous amount of light which can damage the eyes of an operator using the welder. To reduce this damage, the operator typically wears a helmet with a window to look through. The window is made of a material which blocks out the eye damaging light. Unfortunately, the window also blocks out visible light so that the operator has difficulty seeing outside the helmet without raising it up. This causes several problems. For example, it is inconvenient and more difficult to work efficiently. Further, the operator is essentially blind when the helmet is down and the welder is off. This can be dangerous when working in a hazardous work environment. Accordingly, there is a need for a welder which allows the operator to see better when the helmet is down.

SUMMARY OF THE INVENTION

In a welder wand including a welding tip attached to handle with an elongate, rigid conduit, the handle having a trigger for activating the welding tip, improvements therein according to the invention include an optical light system attached to the welder wand consisting of a light source mounted proximate to the welding tip and a switch mounted proximate to the handle. The switch is operatively coupled to the light source for selectively activating and deactivating the light source, whereby the light source produces and directs light at the welding tip when activated by the switch. An articulating arm couples the light source to the welder wand, which allows the attitude of the light to be adjusted to ensure that it directs light toward the welding tip. Preferably, a clamp secures the articulating arm to the elongate, rigid conduit. The handle has a front end, and the switch is attached to the elongate, rigid conduit adjacent to the front end of the handle allowing it to be easily activated by hand while concurrently gripping the handle. In another embodiment, the handle has a butt end, and the switch attached to the handle at the butt end thereof allowing it to be easily activated by hand while concurrently gripping the handle.

In a welder wand including a welding tip attached to handle with an elongate, rigid conduit, improvements therein according to the invention include a light source mounted proximate to the welding tip, and a trigger mounted to the handle operatively coupled to the wending tip and the light source, the trigger movable into a first position activating the light source and a second position concurrently activating the light source and the welding tip, whereby the light source produces and directs light at the welding tip when activated by the trigger. In this embodiment, an articulating arm couples the light source to the welder wand. Preferably, a clamp secures the articulating arm to the elongate, rigid conduit.

In a welder wand including a welding tip attached to handle with an elongate, rigid conduit, the handle having a trigger for activating the welding tip, improvements therein according to the principle of the invention include a light source mounted to the elongate rigid conduit adjacent to the welding tip, a switch mounted to the elongate rigid conduit adjacent to the handle, and the switch operatively coupled to the light source for selectively activating and deactivating the light source, whereby the light source produces and directs light at the welding tip when activated by the switch. A first clip is attached to the elongate, rigid conduit adjacent to the welding tip, and an articulating arm couples the first clip to the light source. A second clip is attached to the elongate, rigid conduit adjacent to the handle, and the switch mounted to the second clip.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings.

DETAILED DESCRIPTION OF THE INVENTION

Figure 1:
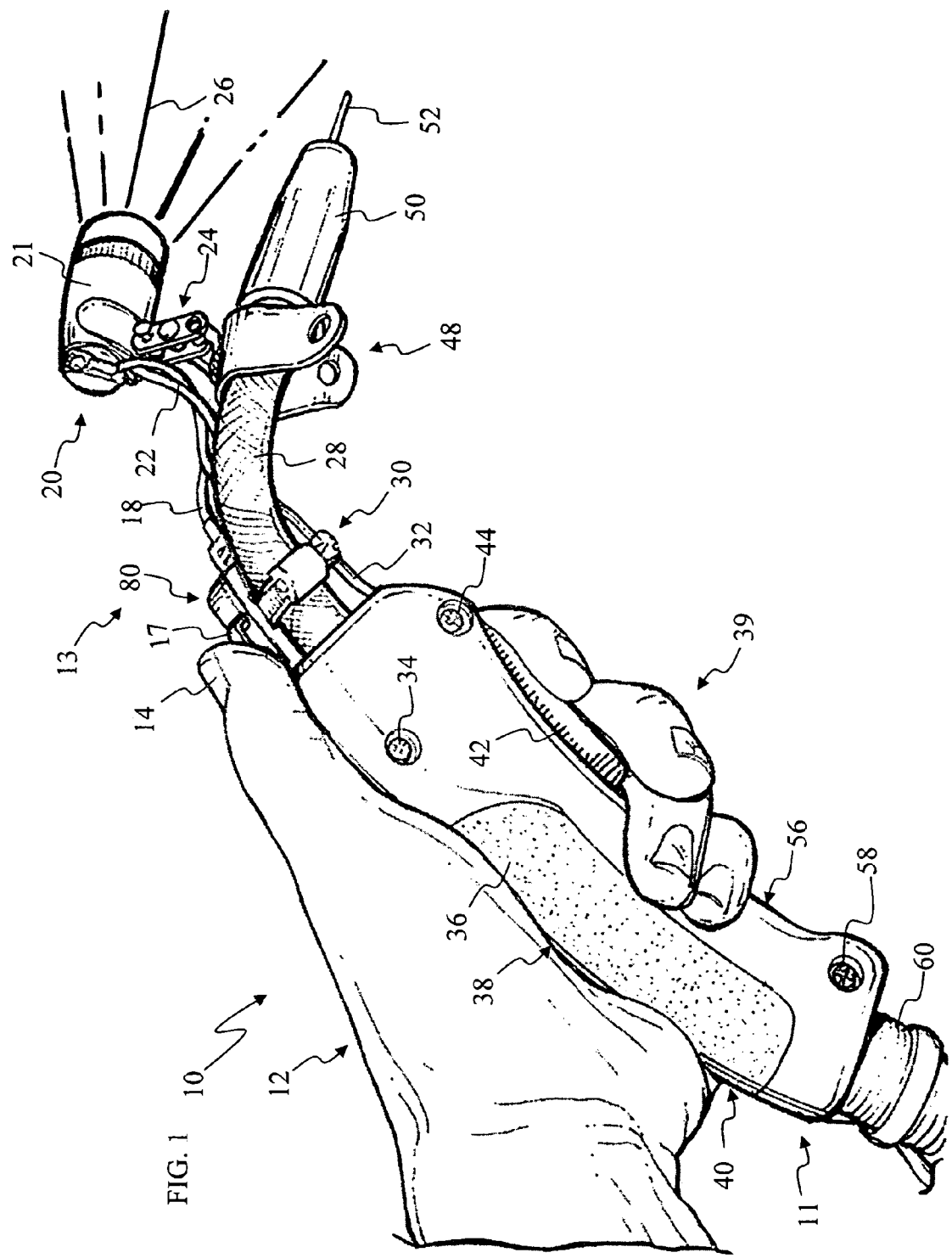
FIG. 1 is a perspective view of a welder wand incorporating an optical light system in accordance with the principle of the invention, the optical light system consisting of a light source operated by a switch.

Turning now to the drawings, in which like reference characters indicate corresponding elements throughout the several views, attention is first directed to FIG. 1 in which there is seen a perspective view of a welder wand 10 incorporating an optical light system 13 in accordance with the principle of the invention. Welder wand 10 is well-known in the art, the specific details of which will readily occur to the skilled artisan and will be discussed only to the extent necessary to support the teachings of the present invention, which consist of improvements therein, namely, the provision of optical light system 13.

Figure 2:
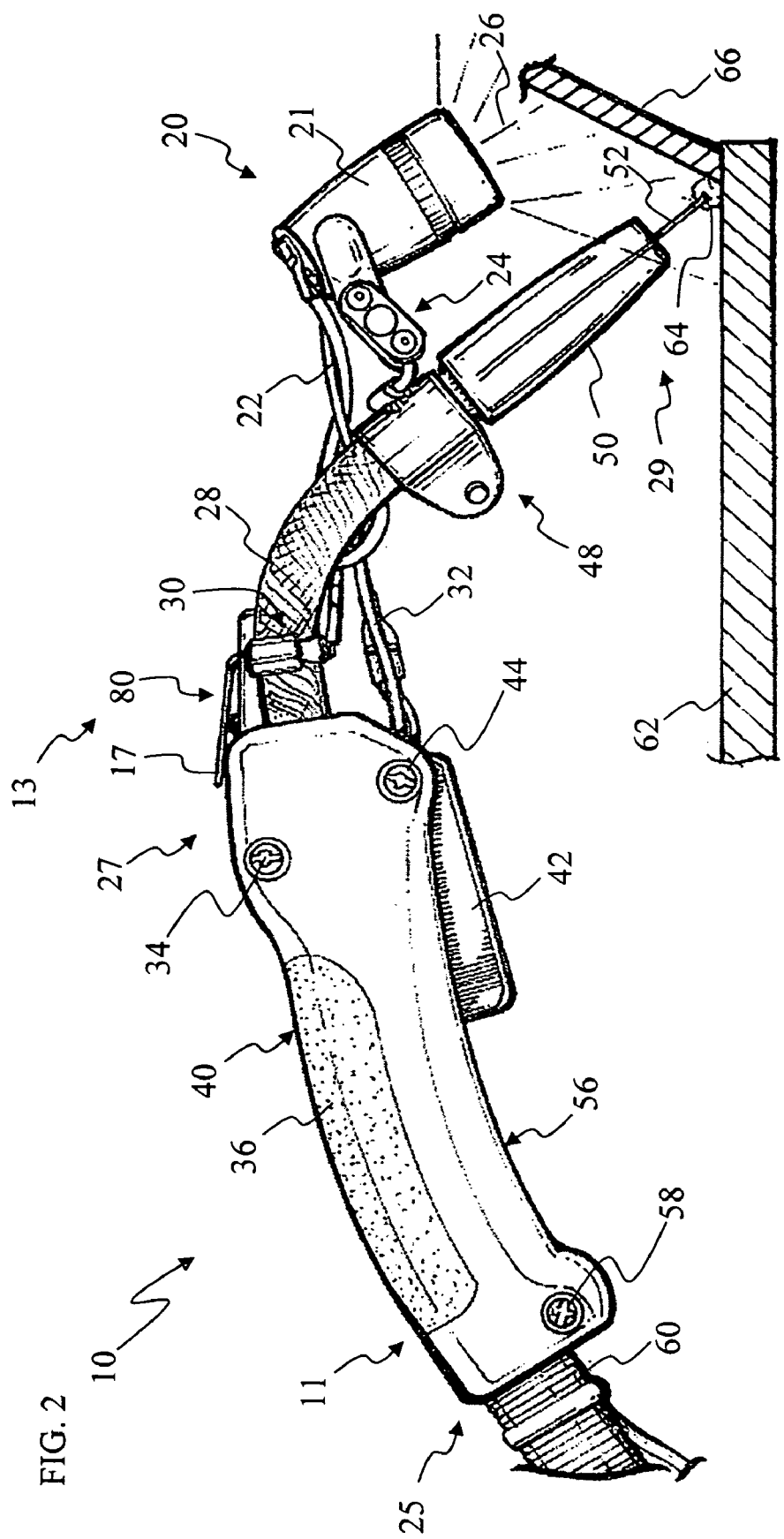
FIG. 2 is a side elevational view of the welder wand of FIG. 1 shown as it would appear forming a weld.

With continuing regard to FIG. 1, and also to FIG. 2, welder wand 10 includes a rigid conduit 28 in which a gas flows therethrough. The gas that passes through conduit 28 is a type typically used in welding, such as oxygen, argon, acetylene, etc., and can include carbon. In this particular example, welder wand 10 is a MIG welder wand forming part of a MIG welder, in which the gas conducted by and through conduit 28 includes argon and carbon. Welder wand 10 is a well-known and conventional MIG welder wand, the specific details of which, as previously intimated, will readily occur to those having ordinary skill in the art.

Briefly, welder wand 10 further includes a nozzle 50, which is attached to the outer end of conduit 28, and an opposing inner end attached to a gas line 60 for delivering gas to conduit 28. A welding tip 52 extends forwardly of nozzle 50 to provide an energy source for igniting the gas exiting from nozzle 50, in which nozzle 50 and tip 52 characterize the business or welding end 29 (FIG. 2) of welder wand 10. A handle 11 is coupled to rigid conduit 28 and has a butt end 25 directed toward gas line 60 and a front end 27 facing nozzle 50. Handle 11 is shaped so that it can be easily grasped by an operator's hand 12. In particular, handle 11 has a surface 40 shaped to conform to the shape of palm 38 of hand 12 and a surface 56 shaped to conform to the inside of fingers 39 of hand 12. Handle 11 includes a grip 36 positioned proximate to surface 40 so that surface 40 fits comfortably into palm 38 of the operator's hand. This configuration of handle 11 is well-known in the art.

In this example, handle 11 is made of two separate complementary plastic pieces which are held together with fasteners 58, 44, and 34, although the separate pieces can be held together in others ways, such as with an adhesive. However, in other examples, handle 11 can be one integrated piece or more than two pieces.

Handle 11 incorporates a trigger 42 which extends outwardly from surface 56 being easily activated and deactivated with the fingers of a user's hand gripping handle 11 as seen in FIG. 1. When trigger 42 is activated, nozzle 50 opens producing a flow of gas therethrough from conduit 28 and an electrical arc is provided by welding tip 52, which ignites the gas provided by nozzle 50. Although not specifically shown, welding tip 52 is coupled to a power source in a well-known manner, in which welding tip 52 is energized with electrical power to produce an electrical arc in response to activation of trigger 42. The ignited gas at welding tip 52 is exceptionally hot and focused, and is used to form a welding bead 64 between work pieces 62 and 66 to fuse/weld them together as shown in FIG. 2. When trigger 42 is deactivated, nozzle 50 is closed stopping the flow of gas therethrough, and welding tip 52 is deenergized thereby eliminating the electrical arc.

Figure 3:
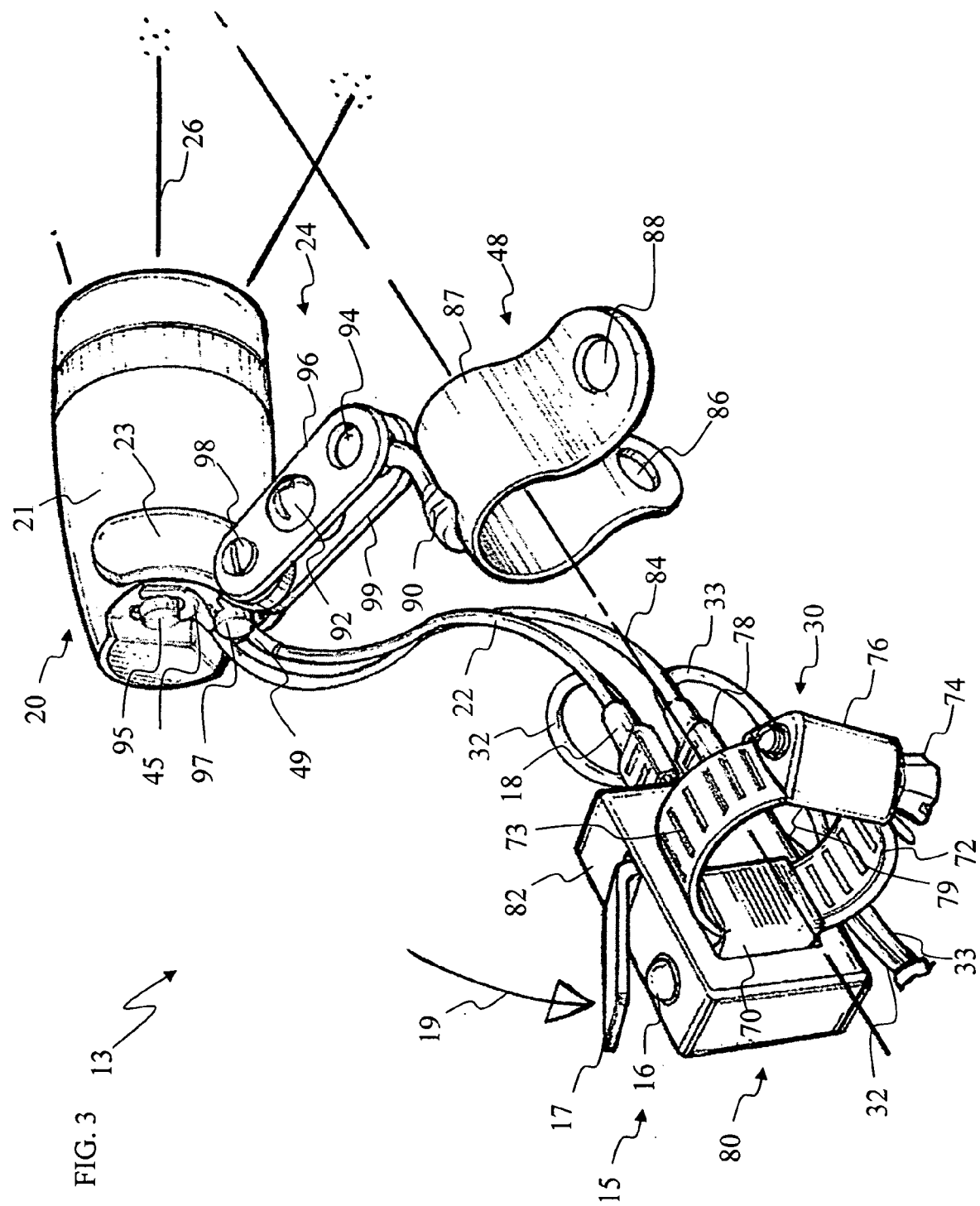
FIG. 3 is a simplified perspective view of the optical light system of the welder wand of FIG. 1.

FIG. 3 is a simplified perspective view of optical light system 13 of FIGS. 1 and 2. Optical light system 13 includes a light source switch assembly 80 coupled in electrical communication with a light source 20, with both being coupled to rigid conduit 28 as shown in FIGS. 1 and 2, in which switch assembly 80 is attached to conduit just forward of front end 27 of handle 11 and light source 20 is located adjacent to nozzle 50 as substantially shown. Electrical power is provided to system 13 from electrical wiring or conductors 32 and 33 coupled to a power source (not shown). Light source 20 generates artificial light, and includes a light emitter maintained by a light fixture or housing 21. The light emitter can be of many different types. In this example, it is an incandescent light bulb, but in other examples it can be a light emitting diode, a halogen light bulb, a fluorescent light bulb, etc.

Switch assembly 80 includes a switch 15 maintained by a housing 82, which encloses conventional electrical control circuitry (not shown) for operating light source 20 in response to operation of switch 15. Conventional electrical circuitry is used by and between switch assembly 80 and light source 20. As a matter of disclosure, electrical conductors 32 and 33 are coupled to the control circuitry through electrical connectors 18 and 78, respectively, and switch 15 includes a lever 17 associated with an electrical contact 16. Switch 15 is coupled to the control circuitry and the control circuitry is coupled to light source 20 through electrical conductors 22 and 84, respectively, in which switch 15 is thereby operatively coupled to light source 20 and is used to operate light source 20, namely, to turn light source 20 ON and OFF. The ends of electrical conductors 22 and 84 are coupled to the control circuitry of switch assembly 80 through electrical connectors 18 and 78, respectively. Opposite ends of electrical conductors 22 and 84 are coupled to light source 20 through clips 45 and 49, respectively. Clips 45 and 49 are coupled to light source 20 through corresponding electrical terminals 95 and 97, which extend through light housing 21. In this way, light source 20 can be activated and deactivated as desired with switch 15. Power to system 13 can be provided from a dedicated power source, a battery, a solar cell, etc.

When light source 20 is activated or ON, light source 20 is illuminated and emits light 26 therefrom and when light source 20 is deactivated or OFF, light source 26 is not illuminated and does not emit light. Switch 15 is shown in the open position in FIG. 3 whereby light source 20 is deactivated or OFF. To activate light source 20, lever 17 is moved in a direction indicated by arrowed line 19 toward contact 16 where it electrically engages it closing a circuit thereby turning light source 20 ON. When lever 17 is released, it moves away from contact 16 to its starting position opening the circuit between switch 15 and light source 20 thereby deactivating light source 20. Switch 15 is a form of toggle switch, and it is to be understood that any suitable form of toggle switch can be used for opening and closing the circuit between it and light source 20. Switch assembly 80 is used to turn light source ON and OFF, and it is to be understood that any suitable and well-known electrical switch assembly can be used to turn light source ON and OFF without departing from the invention.

Switch assembly 80 is attached to conduit 28 with a clamp 30 as shown in FIGS. 1 and 2, which is located just forward of front end 27 of handle 11 thereby locating switch 15 adjacent to front end 27 of handle 11 such that it's lever 17 may be easily engaged and depressed by the user's thumb 14 to operate light source 20 while hand 12 is concurrently gripping handle 11 as seen in FIG. 1. Clamp 30 includes an elongate band 72 formed with perforations 73 positioned at equal intervals along its length. Perforations 73 are elongate with their lengths extending perpendicular to the length of band 72. Opposite ends of band 72 are held together with a coupling member 76 so that band 72 forms an opening 79. A fastener 74 extends through coupling member 76 and is threaded so that the threads engage or otherwise interact with perforations 73. In this way, the size of opening 79 can be adjusted by adjusting fastener 74 so that the force that clamp 30 grips conduit 28 with can be changed. It should be noted that clamp 30 can be of many different types, but only one type is shown here for illustrative purposes. Clamp 30 is coupled to housing 82 with a bridge 70 through which band 72 extends. It should be noted that clamp 30 can be coupled to housing 82 in many other different ways. For example, it can be coupled using an adhesive or clamp 30 can be integrated with housing 82.

Light source 20 is coupled to conduit 28 with a clip 48 and an articulating connector 24. Articulating connector 24 allows the direction and orientation of light source 20 to be adjusted, namely, pivoted and rotated, as needed to ensure that when it is activated it produces and directs light at welding tip 52. Clip 48 is coupled to conduit 28 just rearwardly of nozzle 50, and connector 24 is coupled to clip 48 on one end and light source 20 on its other end. Clip 48 includes a U-shaped body 87 that clamps over conduit 28, in which conduit 28 is gripped by the inner surface of clip 48. Openings 86 and 88 formed in opposite ends of body 87 and are sized and positioned so that a fastener (not shown) may be positioned therethrough and attached to more firmly secure body 87 to conduit 28.

In this embodiment, connector 24 consists of an elongate arm 90 having an end coupled to body 87 and an opposing end coupled to an articulated attachment joint 94. Connector 24 also includes a pair of elongate, parallel members or struts 96 and 99. Members 96 and 99 each have openings formed in opposing inner and outer ends thereof and an intermediate opening therebetween formed in their middles. These intermediate or midline openings are configured to receive a fastener 92 that holds members 96 and 99 together. In this instant, fastener 92 is a threaded fastener, although it may be a rivet or other suitable fastener. The openings formed in inner ends of members 96 and 99 grasp and retain articulated attachment joint 94, and the openings formed in the outer ends of members 96 and 99 grasp and retain a bracket 23 affixed to light housing 21. Fastener 92 is a threaded fastener which extends between members 96 and 99, and can be adjusted by rotating it to adjust the grip applied to bracket 23 by the outer ends of members 96 and 99.

Figure 4:
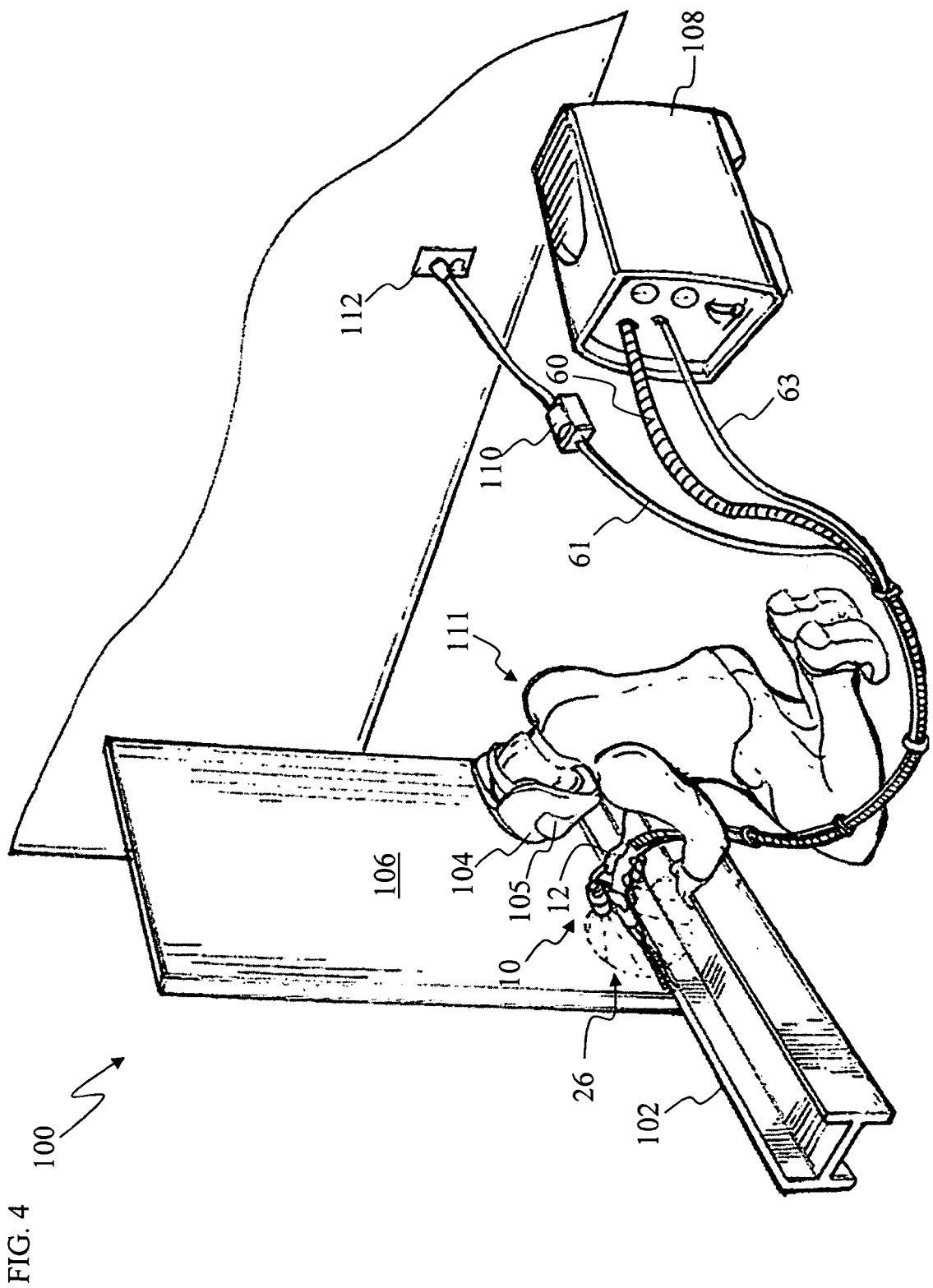
FIG. 4 is a simplified perspective view of the welder wand of FIG. 1 shown as it would appear in use.

FIG. 4 is a simplified perspective view of the welder wand and optical light system of FIGS. 1 and 2 being used in a work space 100 in accordance with the present invention. Work space 100 includes work pieces 102 and 106 which are desired to be welded together using welder wand 10. A welding machine 108 is coupled to welder wand 10 through gas line 60 and a power line 63, together forming a welder. Power line 63 is coupled to welding tip 52 and provides the energy source to ignite the gas provided by nozzle 50. Electrical conductors 32 and 33 are housed within a power line 61 which is coupled to an outlet 112 through a fuse box 110. Outlet 112 provides the power to operate optical light system 13 and fuse box 110 provides surge protection and safer operation of it.

An operator 111 is shown in FIG. 4 wearing a hood 104 formed with a window 105, and operating welder wand 10 with his hand 12 (See FIG. 1). To operate welder wand 10 in a welding operation, trigger 42 and switch 15 (FIGS. 1, 2, and 3) are concurrently depressed thereby concurrently activating welding tip 52 for welding and activating light source 20 illuminating welding tip 52. It should be noted that operator 111 is using his or her right hand in FIG. 4 and his or her left hand in FIG. 1. However, handle 11 is configured to fit comfortably in either hand in these examples and the right and left hands are generally designated as hand 12. Window 105 attenuates the light that is incident to it thereby protecting the user's eyes from damage due to the bright light created from welding. The light can be visible light and other damaging light, such as ultraviolet, that can damage the operator's eyes. Since the visible light is attenuated, it is difficult for operator 111 to see when welder wand 10 is off and helmet 104 is down.

It is difficult for a user to see if he or she has been welding and helmet 104 is up because the eyes constrict in response to bright light and take time to adjust to more light. This problem is reduced because operator 111 can use light source 20 by activating switch 15 to provide light 26, as discussed in detail above, so that he or she can better see while welding. Light source 20 is directed such that when ON directs light 26 forwardly of nozzle 50 to illuminate the working area at which a weld is to be formed at welding tip 52, in accordance with the principle of the invention. With light 26 ON and activated it illuminates the area being welded and when the welder is deactivated and light 26 remains illuminated with switch 15 it provides sufficient illumination to the welding area that the user can still see the illuminated welding area through the window 105 of the hood after deactivating welding tip 52 without having to raise the hood, in accordance with the principle of the invention. In this way, a user need not continually raise and lower the hood, in accordance with the principle of the invention, because light 26 provides sufficient illumination so that the user can see the areas illuminated by light 26 through the window 105 of the hood without having to raise the hood. Without light 26, a user essentially becomes blinded when the welder is deactivated being unable to see through the window 105 of the hood, in which case the user must raise the hood in order to see.

Figure 5:
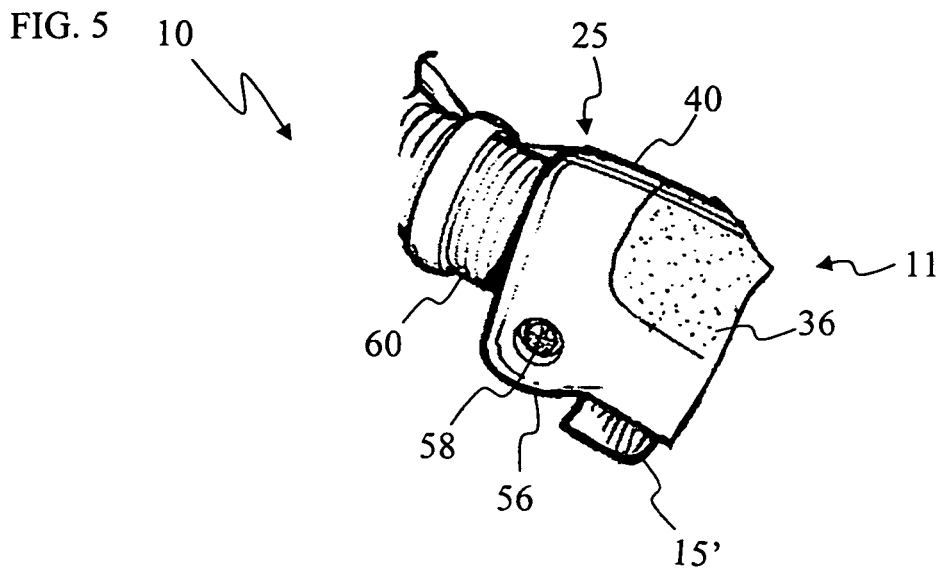
FIG. 5 is a simplified, fragmented perspective view of the welder wand of FIG. 1 incorporating an alternate placement of the switch of the optical light system.

Switch 15 can be configured in different ways, take on many different forms, and located at any suitable location relative to handle 11 for operating light source 20 and for allowing it to be concurrently engaged by a hand gripping handle 11. As a matter of example, FIG. 5 is a simplified, fragmented perspective view of welder wand 10 incorporating an alternate placement of a switch 15' used to operate optical light system 13 (not shown in FIG. 5). In this embodiment, switch 15' is configured as a conventional trigger toggle switch and is positioned at surface 56 near butt end 25 so that the operator can activate light source 20 with his pinky finger while concurrently gripping handle 11. The operation of switch 15' is identical to that of switch 15 in every other respect.

Figure 6:
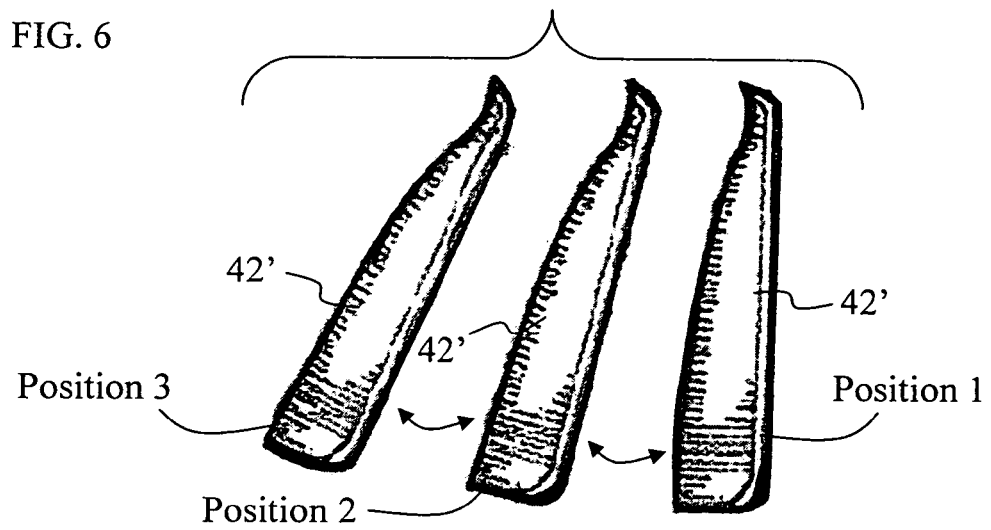
FIG. 6 is a partially schematic side elevational view of illustrating three different positions of a trigger for use with the welder wand of FIG. 1.

FIG. 6 is a partially schematic side elevational view of illustrating three different positions of a multi-function trigger 42' for use with welder wand 10 of FIG. 1. In this example, trigger 42' is similar to trigger 42 as described in more detail above, and is coupled to switch assembly 80 as previously discussed. However, in this embodiment, trigger 42' has three positions so that it operates as a double duty trigger for controlling the operation of both light source 20 and welding tip 52. When trigger 42' is in a Position 1, both light source 20 and welding tip 52 are deactivated. When trigger 42' is in a Position 2, light source 20 is activated and welding tip 52 is deactivated so that the gas from nozzle 50 is not ignited. When trigger 42' is in a Position 3, light source 20 is deactivated and welding tip 52 is activated so that the gas from nozzle 50 is ignited. In this way, trigger 42' replaces switch 15 shown in FIGS. 1–3. Trigger 42' is a conventional multi-function trigger.

Figure 7:
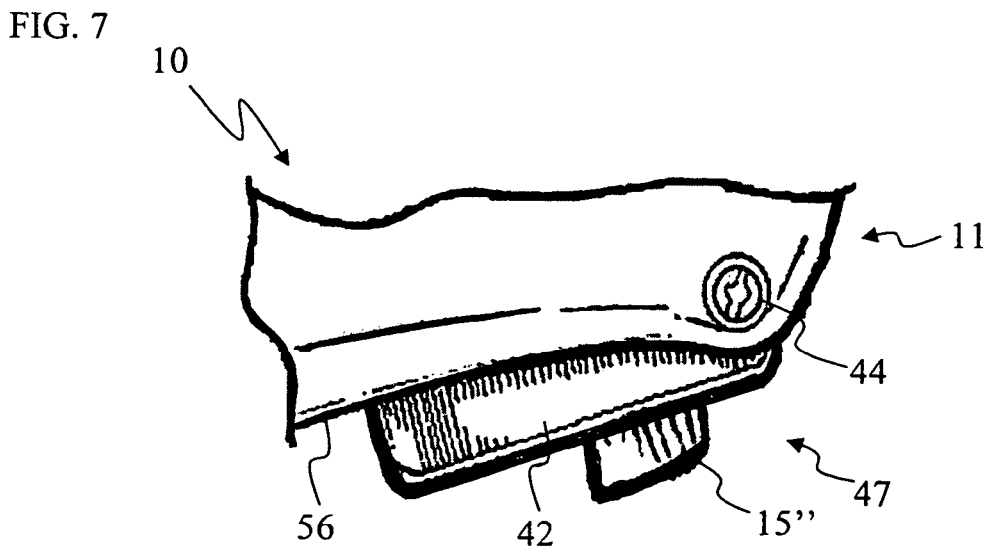
FIG. 7 is a fragmented side elevational view of the welder wand of FIG. 1 incorporating a trigger configured with a switch for operating the light source of the optical light system in accordance with the principle of the invention.

FIG. 7 is a fragmented side elevational view of welder wand 10 of FIG. 1 incorporating trigger 42 shown as it would appear configured with a switch 15" for operating optical light system 13 in accordance with the principle of the invention. In this embodiment, trigger 42 is formed with switch 15". Switch 15" extends through trigger 42 and is coupled to switch assembly 80 (not shown) so that it can activate and deactivate light source 20 in a manner similar to switch 15. Switch 15" is configured as a conventional trigger toggle switch that extends through trigger 42 so that the operator can activate light source 20 with his fingers while concurrently gripping handle 11. The operation of switch 15" is identical to that of switch 15 in every other respect.

The invention has been described above with reference to a preferred embodiment. However, those skilled in the art will recognize that changes and modifications may be made to the embodiment without departing from the nature and scope of the invention. For instance, although welder wand 10 is a MIG welder wand according to this disclosure, welder wand can be any desired welder wand incorporating the improvements of the invention, namely, light system 13. Various changes and modifications to the embodiment herein chosen for purposes of illustration will readily occur to those skilled in the art. To the extent that such modifications and variations do not depart from the spirit of the invention, they are intended to be included within the scope thereof. Having fully described the invention in such clear and concise terms as to enable those skilled in the art to understand and practice the same,

The invention claimed is:

1. In a welder wand including a welding tip attached to handle with an elongate, rigid conduit, improvements therein comprising:
 a light source mounted proximate to the welding tip; and
 a trigger mounted to the handle operatively coupled to the welding tip and the light source, the trigger movable into a first position activating the light source and a second position concurrently activating the light source and the welding tip, whereby the light source produces and directs light at the welding tip when activated by the trigger.

2. The improvements according to claim 1, further comprising an articulating arm coupling the light source to the welder wand.

3. The improvements according to claim 2, further comprising a clamp securing the articulating arm to the elongate, rigid conduit.

* * * * *